C. J. LAKE.
POWER PLANT.
APPLICATION FILED JAN. 21, 1918.
1,279,128.
Patented Sept. 17, 1918.
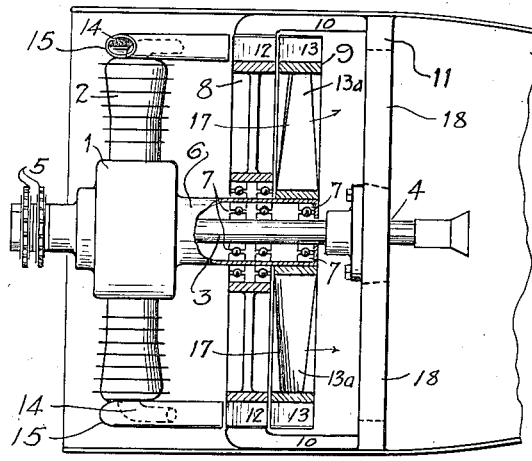
Fig. 1.
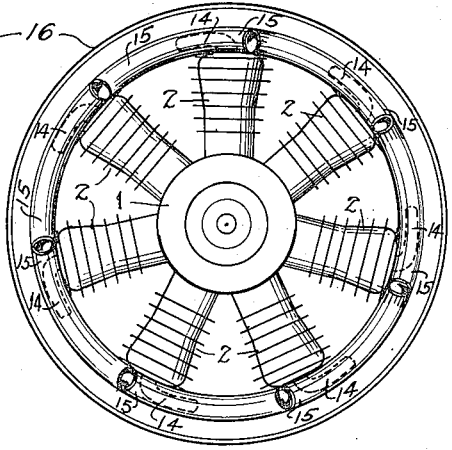
Fig. 2.
Fig. 3.
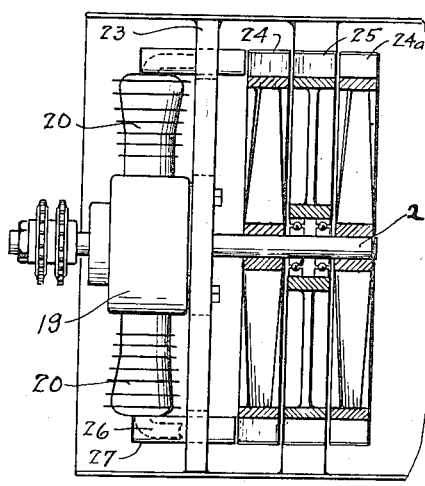
Fig. 5.
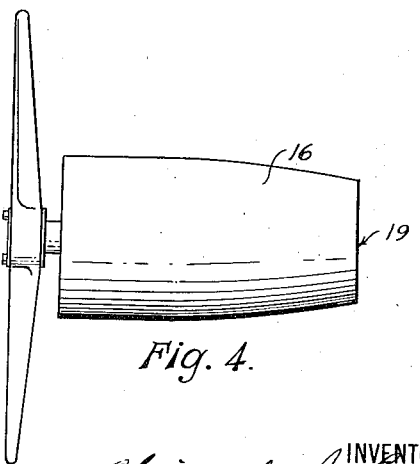
Fig. 4.
INVENTOR
Christopher J. Lake
BY
ATTORNEY

UNITED STATES PATENT OFFICE.

CHRISTOPHER J. LAKE, OF BRIDGEPORT, CONNECTICUT.

POWER PLANT.

1,279,128.   Specification of Letters Patent.   Patented Sept. 17, 1918.

Application filed January 21, 1918. Serial No. 213,106.

*To all whom it may concern:*

Be it known that I, CHRISTOPHER J. LAKE, a citizen of the United States, and resident of Bridgeport, in the county of Fairfield and State of Connecticut, have invented certain new and useful Improvements in Power Plants, of which the following is a specification.

This invention relates to power plants wherein internal combustion cylinders furnish the source of energy, and my improvements are directed to the production of a complete unit comprehending the power cylinders, member driven thereby, and constituent elements whereby I am enabled to provide for the highly efficient functioning of the power plant.

Among the more difficult problems confronting engineers in the employment of power plants as for airplanes, seaplanes, motor-boats, etc., I have noted those for which solutions are presented hereunder as the special objects of this application, to wit:

(1) The muffling or dissipation of the noise of motor exhaust, and the utilization of a large proportion of the exhaust energy now wasted.

(2) The cooling of the motor to its most efficient workable temperature, which cannot be done by the present water cooling system (aside from the freezing condition in higher altitudes or in winter). Various means of air cooling have been attempted, as by revolving the motor cylinders through the air, but the air resistance to rotation absorbs about 10% of the developed power at ordinary speeds, with increasing losses when more efficient velocity of motor is desirable, especially in all aero-propelled vehicles for land, water and air.

(3) Probably the most illusive and far reaching difficulty of the internal combustion motor lies in the uneven application of energy by its intermitting power strokes, which create excessive stresses, vibration, and momentum-slip of the hammer-like stroke, besides causing crystallization of parts, thereby requiring greater mass and weight in structure than would otherwise be necessary.

For the purpose of in a large measure overcoming the difficulties above recited my invention consists in directing the exhaust gases from the motor cylinders to elements of the power plant which will convert the energy represented by said gases into auxiliary motor power, while at the same time augmenting the power of the exhaust, through the introduction of quotas of atmospheric air, for the two-fold purpose of more efficiently scavenging and thus cooling the cylinder, and for increasing the volume and thus the potency of the exhaust power streams, through varying degrees of expansion, impulse and reaction.

Other features and advantages of my said invention will hereinafter appear.

In the drawings:—

Figure 1 is a side sectional view of a power plant embodying my improvements.

Fig. 2 is a front elevation of the same.

Fig. 3 is a peripheral plan view of Fig. 2.

Fig. 4 is an elevation of a complete unit, on a smaller scale, and

Fig. 5 is a side sectional elevation showing a modification.

In the example of my invention illustrated in Figs. 1 to 3 I have shown a motor having a crank case 1 with a plurality of radial power cylinders 2, said motor being revoluble about a fixed shaft 3 that is mounted in bearings 4. The motor is shown as carrying sprockets 5, which may serve as chain drives for separate aerial propellers, or, obviously the motor, in its rotation, may deliver power for other purposes. Extending from the motor and surrounding the shaft 3, in concentric relation to the latter, is a sleeve 6, ball bearings 7 being provided between said sleeve and shaft. A stator 8 and a rotor 9 are respectively disposed axially with relation to sleeve 6, the stator being stationary and provided with ball bearings between it and said sleeve, and the rotor being fixed upon said sleeve, to rotate therewith. The stator may be rigidly held as by brackets 10 which are connected to frame portions 11. The stator is shown as arranged next adjacent the revoluble motor, and is provided with a concentric series of curved blades 12 that are transversely concaved in a direction opposite to the direction of rotation of the motor. The rotor, which is separated from the motor by the stator, is similarly provided with a concentric series of curved blades 13 that are transversely concaved in the opposite direction to the blades 12. The number of stators and rotors, in alternate relation, may be increased at will, their purpose being to costitute a turbine which will utilize the energy of the exhaust gases in the power plant, and which, suplemented by energized air currents, will function as a muffler during the expansion of said gases. Between the base for the blades 13 and the rotor hub I provide a series of propeller blade like spokes 13ª.

The motor cylinders are each shown as having an exhaust nozzle 14 which lies axially within an air tube 15, whose restricted portion is contiguous to the exhaust nozzle outlet. In passing the blades 12, with the rotation of the motor, the exhaust gases and commingled air may be delivered impactingly, in succession, against the concaved surfaces of said blades. The mouth of air tube 15 lies in a direction facing the resultant of the rotative and transition air currents, hence, according to the speed of travel and motor rotation, receiving a swift current of air, which adds to the volume of the exhaust gases traversing the tube, while the heat from the exhaust gases expands and accelerates the air current, thus amplifying both the volume and force of fluid impact upon the blades 12, which force is communicated to the adjacent rotor 9 by deflection of the combined fluids from the blades 12 to the blades 13. It will be evident that the exhaust energy thus impacted against the blades 12 (with reaction against the motor) will be transferred to the blades 13 and become translated, through rotor 9, into supplemental driving power for the motor; besides serving to overcome any tendency to a backward movement of the motor. Further, the effect of the combined fluid discharges, both upon the stator and rotor, and any series thereof, is to afford a continuous torque to the motor in its rotation, and thus to counteract the deleterious influences of intermittency in impulse, with which, in the functioning of the power cylinders, the motor otherwise operates.

A further and exceedingly important advantage resulting from the employment of the air tubes 15, resides in the institution thereby, through the swift rush of air, past the nozzles 14 therein, of a powerful entraining action, whereby the efflux of the exhaust gases is expedited, and thus the cylinders are more thoroughly and completely scavenged than is otherwise possible. The still further advantage is hereby attained that, in more quickly and thoroughly removing the burnt gases from the cylinder, cooling of the latter is thus greatly facilitated.

The flow of mingled gases and air induced by the exhaust and ejected through the turbine and radially confined in their path by the circular formation of casing 16, are finally discharged at the rear of said casing as a fluid column, whose speed of travel and rarefaction, generates a suction pull with which the propeller like blades 13ª coördinate, to draw rapid currents of air over the motor in an effort to satisfy the vacuous condition thus set up. The cylinders are in this manner subjected to a considerable degree of external cooling, because the suction produced draft passes over and between the radially disposed cylinders, thence through the openings 17 in the stator and rotor and openings 18 in the circular frame 11. Obviously, to attain the most satisfactory cooling results through the means described the diameter of the final exit 19 should be of no less area than the sum of the openings in the power plant in a transverse area thereof.

In the modification shown in Fig. 5 will be seen an example of a stationary motor 19 having radial power cylinders 20, mounted upon a revoluble shaft 21. The shaft 21 carries rotors 24, 24ª, and a stator 25 is mounted, by ball bearings, on said shaft, said rotors and stator comprising a turbine. Any desired increase in number of rotors and stators may be provided, at will, in similar alternation.

The cylinders 20 are each provided with an exhaust nozzle 26, which lies within an air tube 27 whose opening is arranged forwardly in the direction of travel, the exit of said air tube lying adjacent to the blades of the rotor to direct thereon the mingled exhaust gases and air in the same manner as with the previously recited example of my invention.

The functioning of this modification corresponds with that of said previous example except that herein the air introduced into the tube 27 is received in the line of travel of the power plant.

Variations may be resorted to within the spirit and scope of my said invention and parts thereof used without others.

I claim:—

1. In a power plant, in combination, a motor having radial cylinders, and a turbine including a stator and a rotor, the exhausts from said cylinders co-acting with said turbine to augment the driving power of said motor, and means, functioning under the influence of relative movement between said motor and turbine, whereby currents of air are directed to quicken the exhaust action by entrainment, and whereby the addition of heat from said exhaust gases to the currents of air increases the effective velocity and impact of the combined fluid media.

2. In a power plant, in combination, a revoluble motor having radial cylinders, and a turbine including a stator and a rotor, said cylinders having exhaust nozzles and means in connection with said nozzles whereby currents of air are directed to effect an entraining action to scavenge the cylinders and whereby the addition of heat from said exhaust gases to the currents of air increases the effective velocity and impact of the combined fluid media.

3. In a power plant, in combination, a revoluble motor having radial cylinders, and a turbine including a stator and a rotor, said cylinders having exhaust nozzles, means in connection with said nozzles whereby currents of air are subjected to the heat influence of the exhaust gases, and means whereby the mingled gases and air are caused to co-act with said turbine to augment the driving power of said motor.

4. In a power plant, in combination, a motor having radial cylinders, a turbine, means for directing the exhaust gases from said cylinders to operate said turbine, and means for confining and directing the final discharge of said gases in manner to draw cooling air over the motor cylinders.

5. In a power plant, in combination, a motor having radial cylinders, a turbine, means for combining currents of air with the exhaust gases and for directing the combined fluid media to said turbine to operate the latter, and means for directing the final discharge of said fluid media in manner to draw cooling air over the motor cylinders.

Signed at borough of Manhattan, in the city, county and State of New York this 19th day of January, A. D. 1918.

CHRISTOPHER J. LAKE.

Witnesses:
F. W. BARKER,
MONTAGUE PALMER.